Jan. 17, 1928.
A. E. LONGSTRETH ET AL
1,656,590
METHOD AND MEANS FOR MOLDING CANDY
Filed Feb. 26, 1926   2 Sheets-Sheet 1
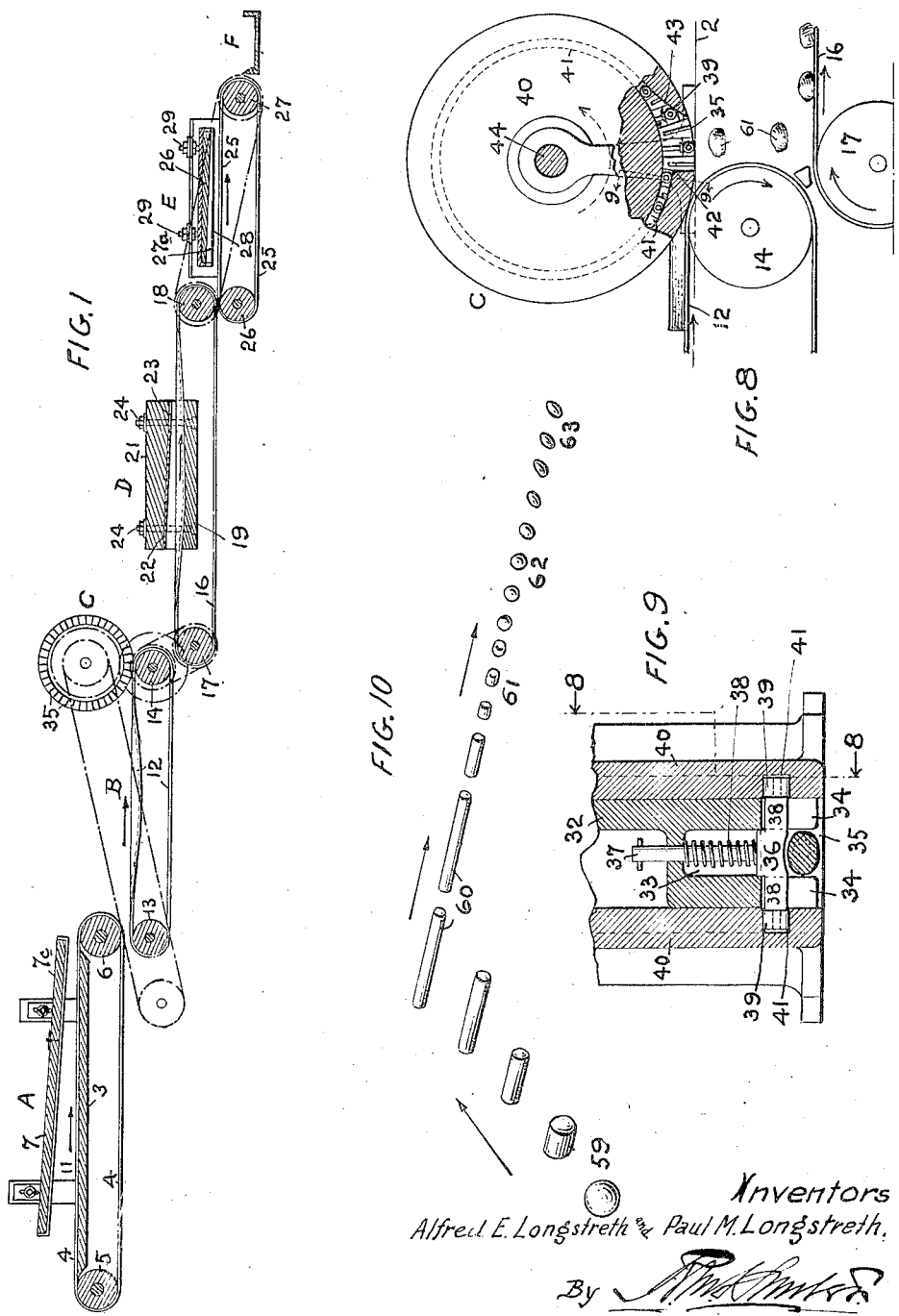
Inventors
Alfred E. Longstreth & Paul M. Longstreth.
By
Attorney.

Jan. 17, 1928. 1,656,590
A. E. LONGSTRETH ET AL
METHOD AND MEANS FOR MOLDING CANDY
Filed Feb. 26, 1926 2 Sheets-Sheet 2
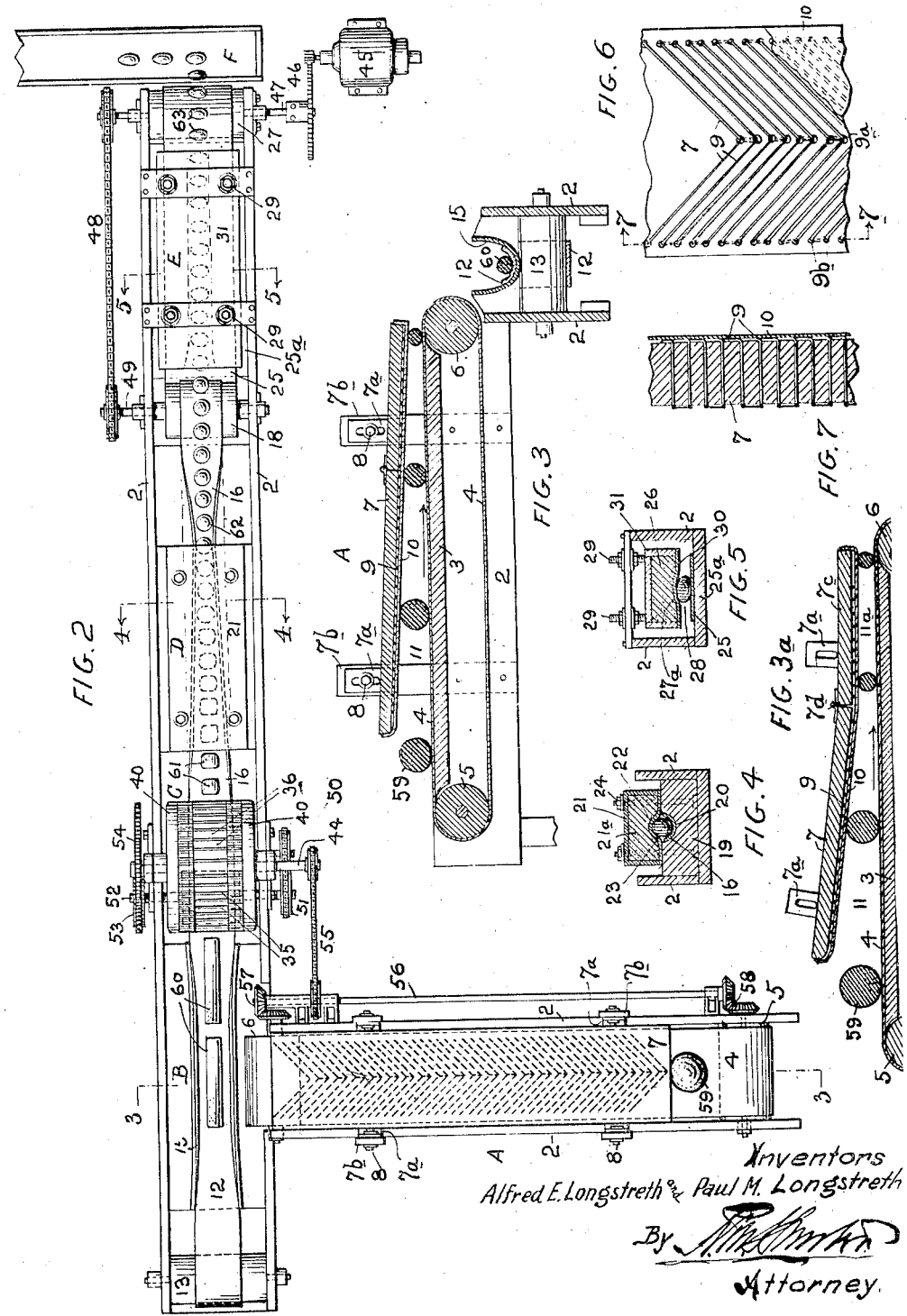
Inventors
Alfred E. Longstreth & Paul M. Longstreth
Attorney Patented Jan. 17, 1928.

1,656,590

UNITED STATES PATENT OFFICE.

ALFRED E. LONGSTRETH AND PAUL M. LONGSTRETH, OF COLLINGSWOOD, NEW JERSEY.

METHOD AND MEANS FOR MOLDING CANDY.

Application filed February 26, 1926. Serial No. 90,718.

There is upon the market a commercial product known as "penny easter eggs" composed of an egg-shaped body of cocoanut or equivalent thick paste coated with a thin layer of chocolate, the sales price of which is one cent. In view of the high price of manual labor, the cost of making such articles for one cent each is such that the profit is only nominal, and to lower the cost as much as possible, the size of the egg must be made very small. Furthermore, hand made eggs are more or less irregular and lack uniformity as a commercial product.

The object of our invention is to provide a machine for automatically making ball or egg-shaped bodies of candy material in a rapid and uniform manner and at nominal expense.

Our object is also to provide the egg-shaped product ready for coating with as little manual handling as possible.

The coating of these egg-shaped bodies is performed as a secondary operation and constitutes no part of our present invention.

Our improved method consists in subjecting a mass of cocoanut paste or other suitable candy material, from which the egg-shaped bodies are to be formed, to successive treatments which first rolls the candy material into cylindrical rods, then changes its direction of travel to alinement with the length of the rod, then subdividing the rod material into definite sized portions, then subjecting the subdivided portions successively to a rolling and shaping action to form ball-shaped bodies, and finally, where the body is to be egg-shaped, subjecting said ball-shaped bodies to a further rolling action wherein the pressure is so disposed as to convert the ball-shaped bodies into egg-shaped products.

Our invention also comprises organized apparatus for successively carrying out the steps of the method above enumerated and includes special details of construction, all of which is fully described hereinafter and more particularly pointed out in the claims.

Referring to the drawings: Fig. 1 is a diagrammatic sectional view illustrating various elements of the machine involved in carrying out our improved method; Fig. 2 is a plan view of the organized apparatus adapted for carrying out the method; Figs. 3 and 3ª are vertical sectional views on line 3—3 of Fig. 2; Fig. 4 is a transverse sectional view of Fig. 2, on line 4—4 of Fig. 2; Fig. 5 is a transverse sectional view on line 5—5 of Fig. 2; Fig. 6 is an enlarged inverted view of a portion of the structure shown in Fig. 3; Fig. 7 is a vertical section taken on line 7—7 of Fig. 6; Fig. 8 is an enlarged view, partly in section, of the means for subdividing the rods of candy material, said section taken on line 8—8 of Fig. 9; Fig. 9 is a transverse section through the means for cutting and ejecting the rod shaped material, and taken on line 9—9 of Fig. 8; and Fig. 10 is a perspective view illustrating the successive changes in the candy material during its progress through the machine.

2 is the general frame work of the machine and supports along its length the following instrumentalities: Means shown at A for rolling a mass of candy material 59 down into a rod shaped form, as indicated at 60; means shown at B for changing the direction of travel of the candy rods 60 and feeding them to the subdividing means; means shown at C for cutting the advancing rods of candy material 60 into uniform smaller portions 61 and discharging the same in spaced relation; means shown at D for rolling the subdivided candy material 61 into ball-shaped bodies 62; means shown at E for rolling the ball-shaped bodies 62 into egg-shaped bodies 63; and means shown at F for receiving the final product ready to be coated.

We will now refer more particularly to the details of construction of the several elements whose successive operations produce the final result desired.

The means A, for rolling down a mass 59 of candy material into the rod form 60, comprises the following instrumentalities: An endless apron 4 is caused to travel about rollers 5 and 6 at opposite ends of a substantially horizontal table, so as to constitute a traveling floor. Arranged above the table and apron is an inclined board 7 having its lower surface covered with a canvas sheet 10 and preferably further provided, between the canvas sheet and underside of the board, with wire strands 9 secured in herring-bone form, as shown in Figs. 2, 6 and 7. In securing the wires 9 in position, we provide a central row of holes 9ª and two side rows of holes 9ᵇ, and through these we thread the wires as shown to provide the oppositely directed oblique wires 9 tightly stretched against the under surface of the board 7.

The jointed board 7 is somewhat shorter than the endless apron 4 so as to leave a front surface or vestibule whose floor is the endless apron for receiving the plastic mass of candy material 59 (Figs. 2, 3 and 3ª). The inclination of the board 7 is downward toward the discharge end so that the mass 59 is caried into the space beneath the board 7 and into contact with the canvas surface thereof, and thereupon be rolled between the apron and board and caused to spread laterally while being reduced to rod form. The oblique wires 9 give to the canvas 10 a rib-like structure which facilitates the lateral spreading of the candy material and, at the same time, to advance regularly and with an alinement at right angles to the direction of travel of the apron 4. The board 7 may be secured in position in any desired manner, but we have shown a practical manner of supporting the same which consists of upright slotted brackets 7ª on the board bolted at 8 to fixed uprights 7ᵇ secured to the main frame 2 (Fig. 3). The two rollers 5 and 6 are geared together by a shaft 56 and bevel gearing 57 and 58, so as to rotate in the same direction, and the shaft is rotated by chain and sprocket means 55 to be again referred to later on.

The means B comprises an endless apron 12 guided about rollers 13 and 14 and said apron assumes a curved form in traveling over a grooved guide table 15, the same being ararnged at the end of the apron 4 and traveling at right angles to its direction of travel (Fig. 2). The rods 60 of candy material roll from the apron 4 down into the trough 15 and on to the traveling apron 12 and by which the rods 60 are conveyed to the subdividing means C.

The subdividing means C consists of two fixed cam housings 40 having cam grooves 41 and a revolving drum 32 arranged between them, the said drum being secured to a shaft 44 journaled in bearings in the housings, said shaft arranged to drive the chain and sprocket means 55 which operates the shaft 56 before referred to. The drum 32 is provided with an annular groove 33 fitted at intervals circumferentially with transverse cutter blades 35 best formed of saw-blade steel. The annular circumferential walls of the drum are slotted at 34 intermediate of the cutter blades 35 (Figs. 8 and 9), and fitted with transverse ejector bars provided with the central portion 36 crossing the annular space 33 between adjacent cutter blades 35 and having lateral extensions 38 guided in the radial grooves 34 and fitted with rollers 39 on their ends, said rollers fitting into and guided by the cam grooves 41 aforesaid. The ejector bars 36 are each provided with a rod 37 guided radially inward by the drum and surrounded with a coil spring 38 arranged for forcibly moving the ejector bar radially outward when suddenly released by the cam shoulder 42 (Fig. 8). This causes the candy portions 61, which have been severed by the cutter blades 35, to be forcibly knocked out or ejected from the drum space 33. A further rotary movement of the drum brings the rollers 39 again in contact with the cam portions 43 and, by them, moved back once more to their innermost position, where they remain until almost a revolution of the drum has been made and are again released by the abrupt termination of the cam portions at 42, before referred to. When the drum 32 revolves, it does so in contact with the apron 12 and upon which the candy rods rest when being subdivided by the cutters 35 of the drum (Fig. 8). The drum 32 and its shaft 44 are positively driven from the shaft 52 of the roller 14 by gearing comprising a gear 53 on the roller shaft 52 meshing with a larger gear 54 on the cutter drum shaft 44. In this manner, the surface speeds of the apron 12 and the cutter drum 32 are the same.

The construction of the means D, which receives the subdivided candy portions 61 and changes them into ball-shaped forms, consists of a grooved table 19 over which an endless apron 16 travels, said apron guided about rollers 17 and 18 and assuming a grooved shape as it passes over the groove 20 of the table (Figs. 1 and 4). Arranged over the table 19 is a top block 21 consisting of an inverted box with a plaster filling 21ª, also grooved as at 22 and the surface of said groove covered with a canvas layer 23, said table and upper block parts being held together by bolts 24. The grooves directly face each other and form between them a tapered aperture, largest in diameter at the entrance end and smallest at the delivering end, so that as the apron 16 drags the candy masses along through the tapered circular aperture, said masses are caused to rotate between the upper and lower grooved parts and thereby take on the shape of balls, as shown at 62. It will be seen that the shaft 50 of the roller 17 is connected to shaft 52 of the roller 14 by sprocket and chain power transmission means 51 (Fig. 2).

The ball-shaped candy bodies 62 may be considered as the final shape, if so desired, but when egg-shaped forms are required for the bodies, they are given a further treatment in the means E, the said means consisting of a flat table 25ª over which an endless apron 25 travels, said apron being guided about rollers 26 and 27; and above which apron is arranged a plaster form 26 within an inverted box 31 and grooved on its underside, as at 27ª, said groove preferably covered with canvas 30 (Fig. 5). The groove 27ª is elliptical or with an egg-shaped curvature, by which the ball-shaped bodies 62 are rolled, under the influence of the apron and grooved form, into an egg-shaped final form as at 63 and then passed to the receiving table F. The groove 27ª is preferably wider at the entrance end than where it terminates; and is also preferably somewhat deeper vertically so that when the candy bodies are being rolled through it, they are gradually elongated as well as given the egg-shaped forms. The box and plaster form is suspended by bolts 29 so that the obliquity of the groove to the apron 25 may be readily adjusted.

The shaft 47 of roller 27 is driven by a electric motor 45 (or other source of power) and gearing 46, and said shaft is connected by sprocket chain and wheels with shaft 49 of roller 18 which drives the apron 16. Any other means for imparting proper relative speeds may be employed for those shown, if so desired.

From the foregoing description of the parts making up the entire apparatus, it will be understood that the speeds of movement of the various parts are in timed relation so that the candy material is being conveyed through the machine in a rapid manner, and that in passing successively through the means A, B, C, D and E, it has its shape changed as more particularly indicated in Figs. 2 and 10, the subdivisions thereof made by the subdividing means C supplying the small portions 61 of the material in uniform quantities just sufficient to provide the means for the small finished ball or egg-shaped bodies 62 and 63. The speed of the apparatus is such that these bodies 61, 62 and 63 travel in close succession through the formative means D and E while maintained in separated condition, one with respect to the other, as is clearly illustrated. In the normal operation of the machine, no attention is required except to feed the original masses of candy material 59 to the apron 4 and to remove the final product from the table or receptacle F.

We have described our improved method and means in that particularity which we deem to be the best exposition of our invention and that which we prefer in commercial practice, but we do not restrict or confine ourselves to the minor or secondary details, as such are susceptible of modification which may be resorted to as matters of mechanical skill and without a departure from the spirit of the invention.

Having now described our invention, what we claim and desire to secure by Letters Patent is:

1. The herein described method of molding candy in the form of balls or similar shapes, which consists in rolling a mass of thick paste candy material into rod shaped bodies characterized by rolling the material between two gradually approaching surfaces and simultaneously subjecting the material to a spreading action from the center toward the ends of the material to reduce it to a substantially uniform diameter, moving said rod shaped bodies in the direction of their length and during such movement subdividing the same into substantially equal portions by transverse divisions successively performed, and finally rolling each of the said portions between surfaces having opposing walls to insure the shape desired.

2. The herein described method of molding candy in the form of balls or similar shapes, which consists in rolling a mass of thick paste candy material into rod shaped bodies, moving said rod shaped bodies in the direction of their length and during such movement subdividing the same into substantially equal portions by transverse divisions successively performed, and finally rolling each of the said portions between surfaces having opposing walls to insure the shape desired, and wherein further, the final step of the method consists in first rolling the portions of candy material into ball-shaped form and thereafter subjecting them to a further rolling operation wherein the pressure applied by the surfaces is greater at one side than at the other for converting the ball-shaped material into an egg-shaped material.

3. In a candy molding machine, the combination of means for rolling a mass of thick paste candy material into rod shaped bodies comprising a stationary surface, an apron travelling over said surface, and a second surface arranged on an incline over the travelling apron whereby it gradually approaches said travelling surface along its length toward the discharge end, means for moving the rod shaped bodies so formed in the direction of their length, means for successively subdividing the rod shaped bodies into substantially equal portions, and means for rolling each of the said portions into the shape desired and comprising a stationary surface having a transverse curvature and a travelling surface moving in the direction of the length of the stationary surface and gradually approaching it from one end to the other, whereby the article being rolled is changed in shape by passing along the stationary surface under the rolling influence of the travelling surface.

4. In a candy molding machine, the combination of means for rolling a mass of thick paste candy material into rod shaped bodies, means for moving the rod shaped bodies in the direction of their length, means for successively subdividing the rod shaped bodies into substantially equal portions, and means for rolling each of the said portions into the shape desired, and wherein the means for rolling each of the portions into the shape desired comprises a stationary member and a traveling member which gradually approach each other from the entrance end to the discharge end, and in which further, a stationary grooved support is provided for the traveling member whereby it is given a transverse curvature and the stationary member is grooved and the grooved portion covered with a textile fabric and facing the grooved support for the traveling member.

5. In a candy molding machine, means for rolling a mass of thick paste candy material into rod shaped bodies and forming the same into subdivided parts of substantially equal size, combined with means for rolling the subdivided parts into ball-shaped bodies, and additional means for rolling the ball-shaped bodies into egg-shaped forms.

6. The invention according to claim 5, wherein further, the means for rolling the ball-shaped bodies into egg-shaped forms comprises an endless traveling apron and a stationary member comprised of a longitudinally grooved mass of plaster supported above the apron and inclined thereto in a longitudinal direction, said grooved plaster having a textile covering for the grooved portion thereof and between which and the traveling apron the candy body is rolled into egg-shape form.

7. The invention according to claim 5, wherein further, the means for rolling the ball-shaped bodies into egg-shaped bodies comprises a grooved stationary support and a traveling apron moving over said support and conforming to the groove thereof, and a stationary member having a groove facing the apron and curved transversely so as to apply more pressure to the ball-shaped material on one side than at the other as it travels over the apron, said grooved surface being inclined to the apron whereby the pressure upon the body being molded is gradually increased during the travel thereof between the apron and grooved member, and means being also provided for adjusting the stationary member relatively to the traveling apron.

8. The invention according to claim 3, wherein further, the means for rolling the mass of thick paste candy material into the rod shaped bodies comprises an endless apron and an inclined stationary member arranged over the apron and gradually approaching the same from its entrance to its discharge end, and having its under surface formed with diagonal rib-shaped portions for spreading the material laterally while being rolled between the apron and stationary member and covered with a stationary fabric against which the candy material rolls.

9. In a candy molding machine, the combination of means for rolling a mass of thick paste candy material into rod shaped bodies, means for moving the rod shaped bodies in the direction of their length, means for successively subdividing the rod shaped bodies into substantially equal portions, and means for rolling each of the said portions into the shape desired, and wherein further, the means for rolling the mass of thick paste candy material into the rod shaped bodies comprises an endless apron and an inclined stationary member arranged over the apron and gradually approaching the same from its entrance to its discharge end, and having its under surface formed with diagonal rib-shaped portions for spreading the material laterally while being rolled between the apron and stationary member, and in which the rib-shaped portions are covered with a canvas surface against which the candy material is rolled.

10. In a candy molding machine, the combination of means for rolling a mass of thick paste candy material into rod shaped bodies, means for moving the rod shaped bodies in the direction of their length, means for successively subdividing the rod shaped bodies into substantially equal portions, and means for rolling each of the said portions into the shape desired, and wherein further, the means for rolling the mass of thick paste candy material into the rod shaped bodies comprises an endless apron and an inclined stationary member arranged over the apron and gradually approaching the same from its entrance to its discharge end, and having its under surface formed with diagonal rib-shaped portions for spreading the material laterally while being rolled between the apron and stationary member, the said rib-shaped portions consisting of wires stretched against the under surface of the stationary member in herring-bone fashion and covered with a textile sheet material against which the candy material is rolled.

11. In a candy molding machine, the combination of means for rolling a mass of thick paste candy material into rod shaped bodies, means for moving the rod shaped bodies in the direction of their length, means for successively subdividing the rod shaped bodies into substantially equal portions, and means for rolling each of the said portions into the shape desired, and wherein further, the means for rolling the thick paste candy material into the rod-shaped bodies comprises an endless apron and an inclined stationary member arranged over the apron and gradually approaching the same from its entrance to its discharge end, said stationary member being formed in two parts along its length and adjustable whereby each may be differently inclined to the surface of the apron but forming together a substantially continuous under surface.

In testimony of which invention, we hereunto set our hands.

ALFRED E. LONGSTRETH.
PAUL M. LONGSTRETH.